July 5, 1960      H. A. BERNSTEIN      2,943,476
LIQUID DENSITOMETERS
Filed Sept. 3, 1957      3 Sheets-Sheet 1
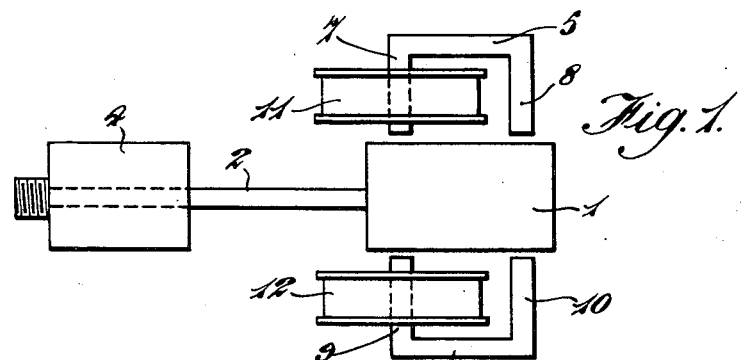
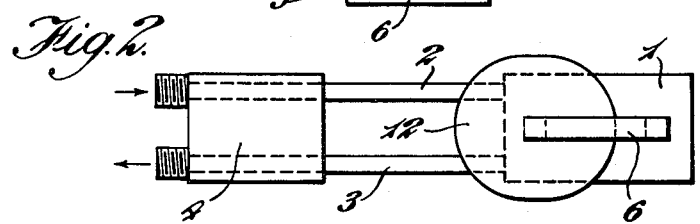
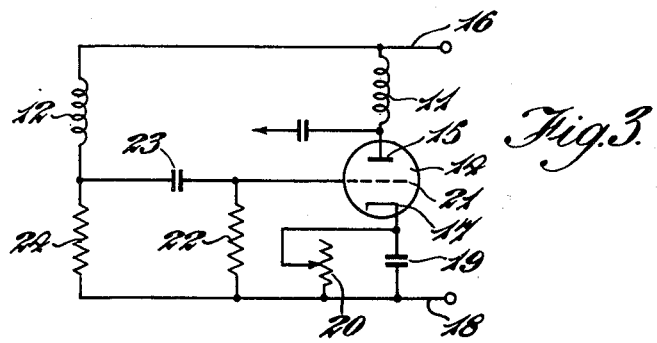
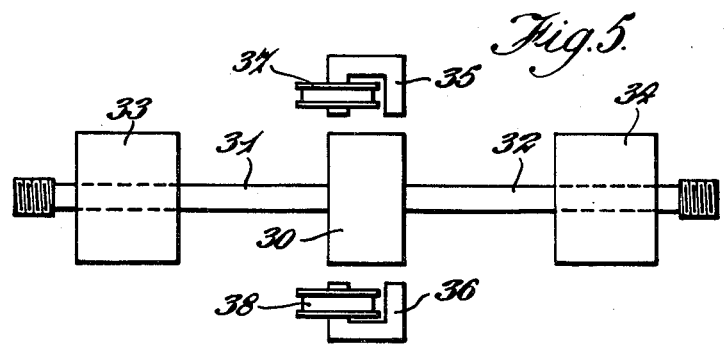
INVENTOR
Harold A. Bernstein
By Watson, Cole, Grindle + Watson
Attorneys

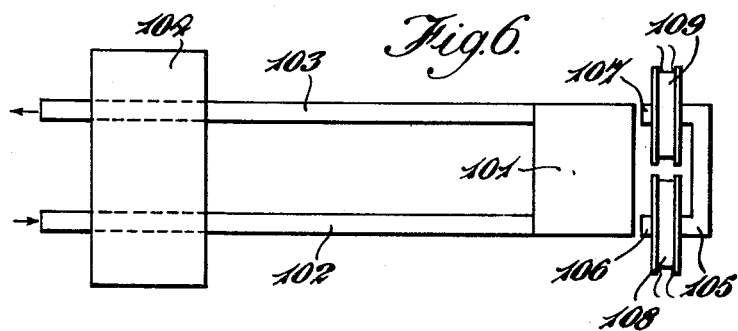
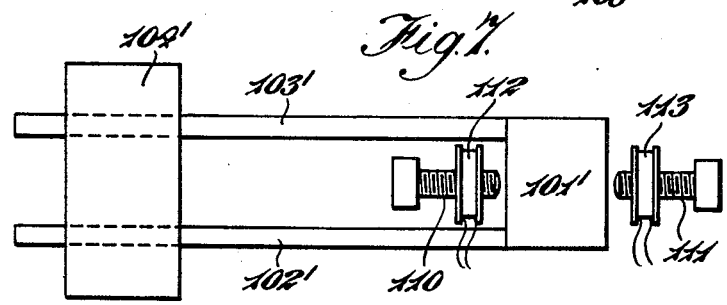
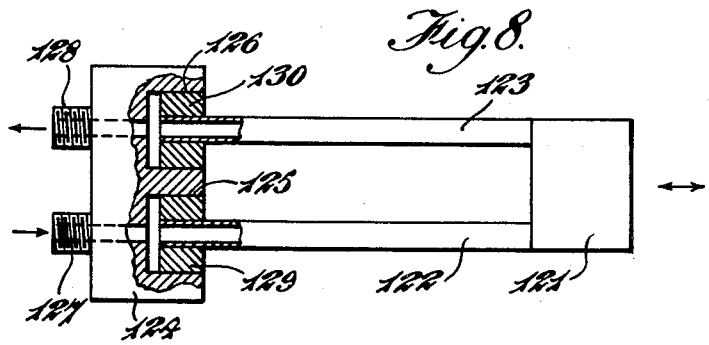

INVENTOR
Harold A. Bernstein

By
Watson, Cole, Grindle + Watson
Attorneys

United States Patent Office 2,943,476
Patented July 5, 1960

2,943,476

LIQUID DENSITOMETERS

Harold A. Bernstein, Cardiff, Wales, assignor to Simmonds Aerocessories Limited, Glamorganshire, Wales Filed Sept. 3, 1957, Ser. No. 681,545

9 Claims. (Cl. 73—32)

This application is a continuation-in-part of my application Serial No. 557,573, filed January 5, 1956, now abandoned.

This invention relates to liquid densitometers, and more particularly to densitometers capable of providing a continuous signal dependent on the density of a liquid which may be moving or stationary.

It is often desirable to have an indication of liquid volume or the amount or rate of liquid flow in terms of mass.

The power which can be obtained from an aircraft fuel, for example, depends not on its volume but on its mass, and it is thus desirable to have the amount of fuel available, and its rate of consumption, indicated continuously in terms of mass. Moreover an accurate knowledge of fuel mass taken on by an aircraft is of great importance to its operator. A long-range aircraft may have fuel tank capacity of 7000 imperial gallons; now AVTUR commercial grade fuel, for example, may at a given temperature vary in specific gravity between 0.78 and 0.83 representing a weight of about 1½ tons for the volume considered. If the mass of fuel taken on can be accurately determined, the aircraft payload can be greater since the allowance for possible errors in mass can be reduced.

It is, therefore, a main object of the invention to provide a liquid densitometer which can conveniently be combined with a liquid content gauge or flow meter of the kind sensitive to liquid volume whereby the required continuous indication in terms of mass can be obtained.

A densitometer of this kind will of course register density changes due to temperature; this overcomes various difficulties associated with density-correcting devices of the kind which are manually set in accordance with occasional density measurements. It is naturally important that temperature variations should not make the densitometer inaccurate and it is a subsidiary object of the invention to provide a densitometer the accuracy of which is unaffected by temperature change and which furthermore does not require for this purpose complicated mechanical or electrical arrangements.

The liquid densitometer according to the invention comprises a support, a hollow member mounted for vibration with respect to the support on one or more supporting elements resilient at least in part and carried by the support remote from the connection of the element(s) with the hollow member, the hollow member being such as not to flex appreciably on vibration, means enabling the continuous passage of liquid into and out of the hollow member said member being completely full of liquid during operation of the densitometer, means for vibrating the hollow member with respect to the support at the natural frequency of vibration, and means to provide an electric signal having a characteristic dependent on the frequency of said vibration and thereby on the density of the liquid.

Preferably the vibrating means is electrical and comprises one or more electrical elements which form, or form part of, said signal-providing means and are adapted to provide a signal having a frequency proportional to the frequency of vibration.

In one preferred form of densitometer the resilient elements are a pair of equal tubes providing the means enabling the passage of liquid to the hollow member and supporting it in the manner of cantilevers. According to an important feature of the invention the two tubes are made of a metal which has such a composition, and is so treated, that its modulus of elasticity changes with temperature in the opposite sense (as regards the density-dependent signal) to changes with temperature in the dimensions of the densitometer, whereby, despite said dimension changes, signals provided by the densitometer are substantially independent of ambient temperature over a working range.

Six examples of densitometer according to the invention will now be described with reference to the accompanying drawings in which:

Figure 1 is a diagrammatic plan view of the first densitometer;

Figure 2 is a diagrammatic side elevation of the first densitometer;

Figure 3 is a diagram of an oscillator circuit forming part of the first densitometer;

Figures 5 to 9 are diagrammatic plan views of the second, third, fourth, fifth and sixth densitometers respectively.

Figure 9:
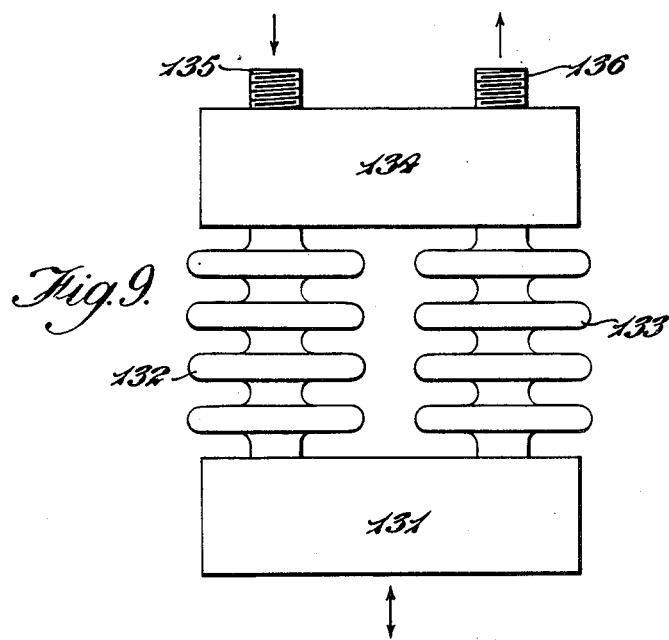

In the first densitometer (see Figures 1 and 2), a hollow cube 1 made of soft magnetic material is rigidly secured to a pair of resilient tubes 2, 3 extending perpendicularly from a vertical side face of the cube at positions near the mid-points of the upper and lower edges respectively of this face. The tubes extend through a clamping block 4 secured to a relatively massive support (not shown) and are arranged for connection to a liquid line (not shown) e.g. by means of bleeds, so that liquid is continuously circulated through one pipe 2, into the cube 1, and out through the other pipe 3, the cube being always completely full of liquid during operation of the densitometer.

A pair of U-pieces 5, 6 of a soft magnetic material is arranged on either side of the cube 1 in a horizontal plane with the free ends of their limbs 7, 8, 9, 10, directed towards the vertical faces of the cube perpendicular to the face from which the tubes 2, 3 extend, and separated from such faces by an air gap. A magnetic circuit is thus established through each U-piece 5, 6 and through the adjacent part of the cube 1. Driving coils 11, 12 are provided one on one limb 7, 9 of each U-piece 5, 6 and the coils are connected to form part of an oscillator.

The oscillator may be such as shown in Figure 3, which is electro-mechanical in operation, the feedback which produces the oscillation resulting from variation of the magnetic circuits formed by the coils 11, 12 and the cube 1 on the movement of the latter. The Figure 3 oscillator comprises a triode valve 14 with its anode 15 connected to an H.T. line 16 through one of the coils 11 and its cathode 17 connected to an earth line 18 through a capacitor 19 and variable resistor 20 in parallel. The setting of the resistor 20 controls the anode current in the valve 14 and hence the amplitude of the movement of the cube 1. The grid 21 of the valve 14 is connected to the earth line 18 through a high resistance 22, and, through a capacitor 23, to the junction point between the other coil 12 and a resistor 24, this coil 12 and resistor 24 being in series between the H.T. and earth lines 16 and 18. A signal is taken from any convenient point in the circuit e.g. the anode 15 of the valve 14.

As will be appreciated, the valve 14 maintains the mechanical oscillation of the cube 1 and the natural frequency of the vibration of the cube determines the frequency of the electrical signals, which do not require separate adjustment to be equal to that frequency.

The cube 1 is caused to vibrate at its natural frequency between the U-pieces 5, 6 i.e. transverse to the tubes 2, 3, which as will be appreciated also vibrate, their vibration being that of loaded cantilevers. The signal from the oscillator, the frequency of which is that of the vibration, is made use of as desired.

The frequency of vibration of the cube 1 is given by:

$$f = \frac{1}{2\pi}\sqrt{\frac{3.04\ EIg}{L^3(M+0.226M_1)(l+k^2/l^2)}}$$

where:

E is the elastic modulus of the tubes,
I is the moment of inertia of the tubes (or rather of such portions as are free to vibrate),
M is the mass of the cube,
k is the radius of gyration of the cube about an axis perpendicular to the tubes and to the plane of vibration,
$M_1$ is the mass of the tubes,
L is the free length of the tubes, and
l is the distance between the centre of gravity of the cube and the support.

The mass of the cube includes the mass of liquid it contains and the expression given above accordingly relates frequency of vibration to the density of the liquid.

Figure 4:
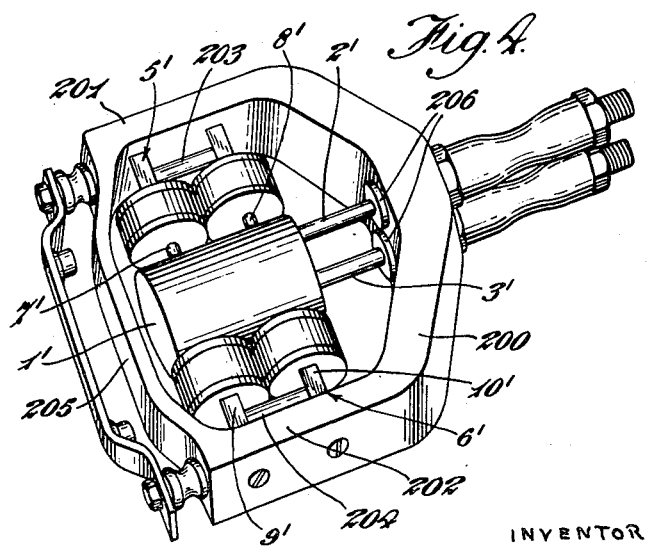
Figure 4 is a perspective view of the first densitometer showing one practical form it may take.

Figure 4 shows a practical form of the first densitometer suitable for mass-production. Parts corresponding to those of the more diagrammatic Figures 1 and 2 are given the same numerals distinguished by a prime. The chief differences of appearance between Figures 1 and 2 and Figure 4 are due to the fact that in Figure 4 the U-pieces 5' and 6' are carried by a relatively massive and rigid yoke 200 providing the support for the tubes 2', 3'.

The yoke 200 is made of non-magnetic stainless steel or preferably of aluminum alloy for the sake of lightness; the limbs 7', 8'–9', 10' of the U-pieces 5', 6' are rigidly screwed to the arms 201, 202 of the yoke and interconnected by cross members 203, 204 forming the bights of the U's. An integral connecting piece 205 extends between the ends of the arms 201, 202 to rigidify the yoke 200. The hollow member 1' is formed by a cylinder of magnetic stainless steel which has a diameter only a little smaller than the spacing of the opposed pole pieces provided by the limb of the U-pieces 5', 6'; the cylinder is closed at its ends and has its axis (when it is at rest) coincident with the centre line of the yoke 200. Each of the two tubes 2', 3' carrying the hollow member 1' is silver-soldered to a brass sleeve 206 rigid with the base of the yoke 200; the general plane of the tubes contains the yoke centre line. The tubes 2', 3' are made of a heat-treated nickel-chromium-titanium-iron alloy, such as the alloy Ni-Span C obtainable from Henry Wiggin & Company Limited.

The alloy Ni-Span C has the following general composition:

Carbon _____ Up to .06%.
Silicon _____ Up to 1.0%.
Phosphorous _____ Up to .04%.
Sulphur _____ Up to .04%.
Manganese _____ Up to 0.8%.
Chromium _____ 4.9–5.5%.
Nickel and cobalt_____ 41–43%.
(Cobalt alone up to 1.0%.)
Titanium _____ 2.2–2.6%.
Aluminium _____ 0.3–0.8%.
Iron _____ The remainder.

The alloy has excellent mechanical properties and has also the characteristic that by a suitable heat treatment it can be given, within certain limits and temperature ranges, any desired temperature coefficient of change of modulus of elasticity, the correct treatment for a given coefficient being found by experiment. As is well known most metals and alloys have a negative coefficient, aluminium showing a 10% drop of modulus of elasticity with 50° C. temperature rise, and steel showing a 1.2% drop. The alloy Ni-Span C can, however, be made to give a zero or positive coefficient though it has heretofore been employed only for springs in precision instruments and in analogous uses where a constant modulus of elasticity is desirable. The densitometer according to the invention makes use of the fact that the alloy can be given a positive coefficient, and does so in the following way.

On rise of temperature all the parts of the densitometer expand. The terms of the above equation relating the frequency of natural vibration to the density of liquid being passed through the densitometer change correspondingly, the effective length of the tubes 2', 3' increasing together with the radius of gyration of the hollow member 1', and the volume of this member also increasing. Another effect of expansion is to increase the air gaps between the pole pieces 7', 8', 9', 10' and the cylinder 1' and hence reduce the strength of magnetic field; this tends to reduce the frequency of vibration, other factors remaining the same.

However the material of the tubes is so treated that its modulus of elasticity increases with temperature in a manner to compensate for the changes with temperature mentioned in the foregoing paragraph.

The densitometer just described is particularly suitable for use in aircraft, as it can be made small and light (e.g. under 2 lbs.), is affected by acceleration to a negligible degree, and can be used over the wide range of temperature often encountered without giving inaccurate indications or requiring complicated correcting circuits.

The second densitometer is illustrated in Figure 5 and the hollow member is a hollow cube 30 of soft magnetic material rigidly connected to a pair of resilient tubes 31, 32 extending coaxially from opposite sides of the cube. The tubes 31, 32 extend through rigid clamping blocks 33, 34 respectively, their free lengths being equal, and are arranged for liquid flow through one tube 31, through the cube 30, and out through the other tube 32.

The cube 30 (and the tubes 31, 32) are caused to vibrate by means of U-pieces 35, 36, coils 37, 38 and an oscillator as described above. The frequency of natural vibration of the cube 30 and tubes 31, 32, which act similarly to a loaded beam encastered at its ends, is given by:

$$f = \frac{1}{2\pi}\sqrt{\frac{195\ EIg}{L^3(M+0.375M_1)}}$$

with the same notation as before.

The third densitometer illustrated in Figure 6 comprises a hollow cube 101 made of soft magnetic material and carried at one end of a pair of similar parallel tubes 102, 103 which are rigid at their other ends with a comparatively massive support 104, the liquid the density of which is to be measured being circulated through one tube 102 into the cube 101 and out through the other tube. The densitometer thus far described resembles the first densitometer, but it is distinguished therefrom by vibration of the cube taking place parallel to the length of the tubes 102, 103, by reason of alternating axial stress therein. To effect such vibration a U-piece 105 of a soft magnetic material is arranged close to the face of the cube 101 remote from the face from which the tubes extend, the limbs 106, 107 of the U-piece being aligned with the tubes 102, 103 to minimize vibration of the wall of the cube in the manner of a diaphragm. Each limb 106, 107 carries a driving coil 108, 109 similar to the coils 11 and 12; the coils 108, 109 are connected in an oscillator circuit similar to that of Figure 3.

The fourth densitometer, illustrated in Figure 7 differs from that of Figure 6 only in the driving arrangement and parts similar to those of Figure 6 are given the same reference numerals distinguished by a prime. The driving arrangement comprises a pair of permanently magnetic screws 110, 111 adjustably mounted in opposite arms of a yoke (not shown) of soft magnetic material whereby one screw 110 is opposite the mid-point of and perpendicular to the face of the cube 101' from which the tubes 102', 103' extend, and the other screw 111 is similarly placed with respect to the opposite face of the cube. Driving coils 112, 113 are mounted one on each screw and connected in an oscillator circuit such as shown in Figure 3. A magnetic circuit is established through the yoke, screw 110, cube 107', screw 111 and back to the yoke, and vibration takes place parallel to the tubes 102', 103'. Adjustment of the screws in the yoke permits variation of the driving force. The faces of the cube 101' through which the driving forces are transmitted are comparatively rigid to minimize their vibration as diaphragms.

The fifth densitometer illustrated in Figure 8 comprises a hollow cube 121 similar to the cube 101 of Figure 6 and carried by a pair of parallel tubes 122, 123 similar to the tubes 102, 103. These tubes 122, 123 are not, however, rigidly fixed to the massive support 124; a pair of cylindrical recesses 125, 126 are formed in the support in alignment with the tubes and with bores 127, 128 whereby liquid is supplied to the cube 121 in the manner indicated in the figure. Each recess 125, 126 receives a comparatively thick-walled cylindrical plug of solder 129, 130 which in turn receives the end of one tube 122, 123 remote from the cube 121, the plugs being connected by soldering to the support and to the tubes. Either of the driving arrangements described with reference to Figures 6 and 7 may be used for vibrating the cube 121 parallel to the tubes.

The sixth densitometer illustrated in Figure 9 comprises a hollow cube 131 made of soft magnetic material; a pair of similar parallel seamless bellows 132, 133 each have one end connected to the cube and the other end connected to a rigid massive support 134. Passages (not shown) are provided in the support 134 whereby liquid can be circulated through inlet 135, bellows 132, cube 131, bellows 133 and outlet 136. Either of the driving arrangements of Figures 6 and 7 can be used to vibrate the cube parallel to the bellows.

In the first and second densitometers vibration takes place transversely with respect to the resilient means supporting the hollow member and can have a frequency as low as a few cycles per second; in all the densitometers of Figures 6 to 9 the vibration takes place longitudinally of such members and the frequency of vibration will generally be high especially in the third and fourth densitometers where the frequency depends on the modulus of elasticity of the material forming the tubes 102, 103 or 102', 103'. In the fifth densitometer, however, the comparatively low modulus of elasticity of the solder reduces the frequency as to some extent the whole assembly of tubes 122, 123 and cube 121 vibrates in the solder plugs 129, 130. In the sixth densitometer the use of bellows instead of tubes gives a lower frequency of vibration than is the case with the third and fourth densitometers, with comparable materials and dimensions.

It will be appreciated that many variations of the third, fourth, fifth and sixth densitometers are possible. Thus the two tubes 102, 103 of the fifth densitometer may be replaced by a single symmetrically-arranged tube, a second tube being disposed within the first to extend well into the cube whereby liquid is introduced into the cube through the annular space between the tubes and removed through the second tube.

The bellows 132, 133 of the sixth densitometer can be replaced by coil springs, the liquid being conveyed to and from the cube 131 by flexible tubes.

It will be understood that though, in the densitometers just described, a cube has been mentioned as the main liquid-containing member it is not necessary that such member be cubical in shape, and that it may have any other desired shape. The cube (or other-shaped hollow member) need not be made of soft magnetic material; it may, for example be made of non-magnetic material and carry armatures of soft magnetic material to coact with the electrical driving means causing vibration.

The driving means must, of course, provide a closed magnetic circuit (apart from inevitable air gaps) but can include E-pieces or pots as well as the U-pieces described above.

The U-pieces 5, 6 or 105, may, instead of being made throughout of soft magnetic material, comprise a portion which is permanently magnetic. In Figure 1 the limbs 8 and 10 may, for example, be permanent magnets the rest of the U-pieces being made of soft magnetic material; alternatively the bight portions of the U-pieces may be permanently magnetic. Where the U-pieces comprise permanently magnetic portions the circuit shown in Figure 3 should be modified to exclude D.C. components in the current fed to the driving coils 11, 12. The arrangement then has the advantages that the current consumption is reduced and the pull of the U-pieces is not affected by variations in the circuit.

In addition, it is not necessary that the support be massive; if it is not so, however, it should be isolated from the surroundings by vibration mounts.

The method of overcoming the effect of temperature on the densitometer described in detail with reference to Figure 4 can be applied to the other forms of densitometer described.

In each densitometer described above, the signal from the member containing the liquid the density of which is to be measured, can be combined with a frequency provided by a fixed oscillator in a frequency selective network so as to give an output having either the ratio, sum or difference of the frequencies of the input signals. This output may be fed to a device comprising a meter sensitive to the volume of liquid flow whereby the device registers the amount or rate of liquid flow in terms of mass. In a modified arrangement, a fixed D.C. level can be used instead of a fixed frequency.

Errors due to temperature variation can be reduced by using materials having low coefficients of expansion and elasticity.

It will be appreciated that, except with low frequencies of vibration, densitometers according to the invention will be little affected by their attitude and by accelerations such as may be encountered in aircraft, for example.

I claim:

1. A liquid densitometer comprising a support, a substantially nondeformable hollow member, at least one supporting element resilient at least in part and connected at spaced points to the support and to the hollow member, said supporting element being composed of an alloy containing iron, chromium, nickel and titanium and having a modulus of elasticity rising with temperature increase, means maintaining a continuous flow of liquid into and out of the hollow member whereby to keep said member filled with liquid during operation of the densitometer, means imparting to the supporting element periodically varying forces to cause the hollow member to vibrate with respect to the support at the natural frequency of vibration and means responsive to vibration of said hollow member for producing an electrical signal having a characteristic dependent on the frequency of said vibration and thereby on the density of the liquid.

2. A densitometer as claimed in claim 1, comprising two supporting elements in the form of a pair of equal bellows.

3. A densitometer as claimed in claim 1 comprising two supporting elements in the form of equal parallel tubes.

4. A densitometer as claimed in claim 1 comprising two supporting elements in the form of equal parallel tubes each connected to the support through a plug of solder which is thereby set in vibration on vibration of the hollow member.

5. A liquid densitometer comprising a support, a substantially nondeformable hollow member, at least one resilient tube rigid at spaced points with the support and with the hollow member to form a cantilever mounting for the hollow member and to form a liquid passage between the support and said member, means providing a second liquid passage between the support and said hollow member to enable continuous circulation of liquid through said hollow member, the hollow member being completely full of liquid during operation of the densitometer, means to vibrate the hollow member with respect to the support at the natural frequency of vibration whereby to set up periodically varying loads on the cantilever which are transverse to and intersect the axis thereof, and means responsive to vibration of said hollow member for producing an electric signal having a characteristic dependent on the density of the liquid, said tube being composed of a metal having a modulus of elasticity changing with temperature in the opposite sense (as regards the density dependent signal) to dimensional changes of the densitometer whereby to minimize the effect of ambient temperature on said density dependent signals.

6. A liquid densitometer according to claim 5, wherein there are two supporting elements in the form of hollow resilient tubes, one to lead liquid to the hollow member and one to lead liquid out of such member, the tubes being aligned and connected to opposite sides of the hollow member.

7. A liquid densitometer as claimed in claim 5, comprising a pair of hollow resilient tubes, one to lead liquid to the hollow member and the other to lead liquid out of such member (and thereby form the second passage providing means), the tubes being equal and parallel, the hollow member comprising ferromagnetic material and the vibrating means comprising core mounted driving coils fixed relatively to the support symmetrically on either side of the hollow member to form variable-air-gap magnetic circuits therewith, each said tube being made of an alloy containing chromium in the region of 5%, nickel in the region of 40% and titanium in the region of 2.4% the balance being iron and impurities, the alloy being heat-treated to have rising modulus of elasticity with temperature increase whereby to compensate for the effect of temperature-induced dimensional changes on said signal.

8. A liquid densitometer comprising a rigid yoke, equal resilient inlet and outlet tubes encastered in and extending through the bight of the yoke with their axes lying in the medial plane between the limbs of said yoke, a hollow member symmetrically and rigidly mounted on the ends of the tubes within the yoke the tubes enabling continuous liquid circulation into and out of said member, coil-mounting cores rigidly secured to the limbs of the yoke opposite the hollow member and providing therewith a pair of magnetic circuits having air-gaps which vary in length on vibration of the hollow member transverse to said medial plane, the tubes being made of a material exhibiting a rise of modulus of elasticity with rise of temperature whereby to neutralize the effect of dimensional changes due to change of ambient temperature, as regards the frequency of vibration of the hollow member for a given liquid density, and means associated with said magnetic circuits to produce a density-dependent electrical signal.

9. A liquid densitometer as claimed in claim 8, wherein the tubes are made of a metal having the following composition:

| | |
|---|---|
| Carbon | Up to .06%. |
| Silicon | Up to 1.07%. |
| Sulphur | Up to .04%. |
| Phosphorous | Up to .04%. |
| Manganese | Up to 0.8%. |
| Chromium | 4.9–5.5%. |
| Nickel and cobalt | 41–43%. |
| (Cobalt alone up to 1.0%.) | |
| Titanium | 2.2–2.6%. |
| Aluminium | 0.3–0.8%. |
| Iron | The remainder. |

References Cited in the file of this patent

UNITED STATES PATENTS

| | | |
|---|---|---|
| 2,358,374 | Ashcraft | Sept. 19, 1944 |
| 2,635,462 | Poole et al. | Apr. 21, 1953 |
| 2,754,676 | Poole | July 17, 1956 |
| 2,889,702 | Brooking | June 9, 1959 |

FOREIGN PATENTS

| | | |
|---|---|---|
| 348,940 | Great Britain | May 21, 1931 |
| 1,110,024 | France | Oct. 5, 1955 |